United States Patent
Morsy-Osman et al.

(10) Patent No.: US 11,245,473 B2
(45) Date of Patent: Feb. 8, 2022

(54) OPTIMUM THREE DIMENSIONAL CONSTELLATIONS FOR OPTICAL INTERCONNECTS EMPLOYING STOKES VECTOR RECEIVERS

(71) Applicant: Telefonaktiebolaget LM Ericsson (publ), Stockholm (SE)

(72) Inventors: Mohamed Morsy-Osman, Dorval (CA); David V. Plant, Montreal (CA); Stephane Lessard, Mirabel (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/264,590

(22) PCT Filed: Aug. 3, 2018

(86) PCT No.: PCT/IB2018/055875
§ 371 (c)(1),
(2) Date: Jan. 29, 2021

(87) PCT Pub. No.: WO2020/026007
PCT Pub. Date: Feb. 6, 2020

(65) Prior Publication Data
US 2021/0234616 A1      Jul. 29, 2021

(51) Int. Cl.
*H04B 10/532* (2013.01)
*H04B 10/67* (2013.01)
*H04B 10/69* (2013.01)

(52) U.S. Cl.
CPC ........... *H04B 10/532* (2013.01); *H04B 10/67* (2013.01); *H04B 10/69* (2013.01)

(58) Field of Classification Search
None
See application file for complete search history.

(56) References Cited

U.S. PATENT DOCUMENTS

| | | | |
|---|---|---|---|
| 2005/0123061 A1* | 6/2005 | Smith | H04L 27/00 375/261 |
| 2007/0212076 A1* | 9/2007 | Roberts | H04B 10/548 398/183 |
| 2016/0204894 A1* | 7/2016 | Dong | H04B 10/69 398/65 |

FOREIGN PATENT DOCUMENTS

WO     2016042535 A1    3/2016

OTHER PUBLICATIONS

Chagnon et al., "Digital Signal Processing for Dual-Polarization Intensity and Interpolarization Phase Modulation Formats Using Stokes Detection", Jan. 1, 2016, Journal of Lightwave Technology, vol. 34, No. 1, pp. 188-195 (Year: 2016).*

(Continued)

*Primary Examiner* — David W Lambert
(74) *Attorney, Agent, or Firm* — Murphy, Bilak & Homiller, PLLC (57) ABSTRACT

An optical modulation apparatus comprises first, second, and third optical modulators arranged so as to collectively modulate light coupled into a first optical input in all three dimensions of the three-dimensional Stokes vector space, to produce an optical output signal. The optical modulation apparatus further comprises a modulating circuit having a digital input configured to N generate first, second, and third modulating signals for driving the first, second, and third optical modulators so as to map digital data to an M-point optical constellation in the optical output signal. The points in the M-point optical constellation are distributed in the three-dimensional Stokes vector space such that the constellation figure of merit for the M-point optical constellation equals at least half of the maximum achievable constellation figure of merit for M points in the three-dimensional Stokes vector space.

11 Claims, 9 Drawing Sheets

Fig. 10

(56) References Cited

OTHER PUBLICATIONS

Chagnon, M., et al., "1 λ, 6 bits/symbol, 280 and 350 Gb/s Direct Detection Transceiver using Intensity Modulation, Polarization Multiplexing, and Inter-Polarization Phase Modulation", OFC Postdeadline Papers, paper Th5B.2, 2015 Optical Society of America,, 2015, 1-3.

Chagnon, Mathieu, et al., "336 GB/s in Direct Detection Below KP4 FEC Threshold for Intra Data Center Applications", IEEE Photonics Technology Letters, vol. 28, No. 20, Oct. 15, 2016, 2233-2236.

Chagnon, Mathieu, et al., "Digital Signal Processing for Dual-Polarization Intensity and Interpolarization Phase Modulation Formats Using Stokes Detection", IEEE Journal of Lightwave Technology, vol. 34, No. 1, Jan. 1, 2016, 188-195.

Chagnon, Mathieu, et al., "Half-Terabit Single-Carrier Direct-Detect Transceiver, Formats, and DSP: Analysis and Demonstration", Journal of Lightwave Technology, vol. 36, No. 2, Jan. 15, 2018, 447-459.

Che, Di, et al., "160-Gb/s Stokes Vector Direct Detection for Short Reach Optical Communication", OFC Postdeadline, paper Th5C.7, 2014 Optical Society of America, 2014, 1-3.

Che, Di, et al., "High-Spectral-Efficiency Optical Direct Detection Using the Stokes Vector Receiver", 2015 European Conference on Optical Communications (ECOC), Sep. 27, 2015, 1-3.

Chen, X., et al., "218-Gb/s Single-Wavelength, Single-Polarization, Single-Photodiode Transmission Over 125-km of Standard Singlemode Fiber Using Kramers-Kronig Detection", OFC, paper Th5B.6, 2017 Optical Society of America, 2017, 1-3.

Cisco Corp., "Cisco Global Cloud Index: Forecast and Methodology, 2016-2021", 2018, 1-46.

El-Fiky, Eslam, et al., "168-Gb/s Single Carrier PAM4 Transmission for Intra-Data Center Optical Interconnects", IEEE Photonics Technology Letters, vol. 29, No. 3, Feb. 1, 2017, 314-317.

Forney, G. David, et al., "Multidimensional Constellations—Part I: Introduction, Figures of Merit, and Generalized Cross Constellations", IEEE Journal on Selected Areas in Communications, vol. 7, No. 6, Aug. 1989, 877-892.

Hoang, Thang, et al., "280-Gb/s 320-km Transmission of Polarization-Division Multiplexed QAM-PAM with Stokes Vector Receiver", OFC 2017, paper W3B.4, 2017 Optical Society of America, 2017, 1-3.

Kanazawa, Shigeru, et al., "Transmission of 214-Gbit/s 4-PAM signal using an ultra-broadband lumped-electrode EADFB laser module", OFC Postdeadline Papers, paper Th5B.3, 2016 Optical Society of America, 2016, 1-3.

Le, S. T., et al., "8x256Gbps Virtual-Carrier Assisted WDM Direct-Detection Transmission over a Single Span of 200km", 2017 European Conference on Optical Communication (ECOC), Sep. 17-21, 2017, 1-3.

Li, Zhe, et al., "SSBI Mitigation and the Kramers-Kronig Scheme in Single-Sideband Direct-Detection Transmission With Receiver-Based Electronic Dispersion Compensation", Journal of Lightwave Technology, vol. 35, No. 10, May 15, 2017, 1887-1893.

Lowery, Arthur James, et al., "Orthogonal-frequency-division multiplexing for dispersion compensation of long-haul optical systems", Optics Express, vol. 14, No. 6, 2006 OSA, Mar. 20, 2006, 2079-2084.

Mardoyan, Haik, "84-, 100-, and 107-GBd PAM-4 Intensity-Modulation Direct-Detection Transceiver for Datacenter Interconnects", Journal of Lightwave Technology, vol. 35, No. 6, 2017 IEEE, Mar. 15, 2017, 1253-1259.

Mecozzi, Antonio, "Kramers-Kronig coherent receiver", Optica, vol. 3, No. 11, 2016 Optical Society of America, Nov. 2016, 1220-1227.

Morsy-Osman, M., et al., "1λ × 224 Gb/s 10 km Transmission of Polarization Division Multiplexed PAM-4 Signals Using 1.3 μm SiP Intensity Modulator and a Direct-Detection MIMO-based Receiver", 2014 European Conference on Optical Communication (ECOC), Cannes—France, Sep. 21-25, 2014, 1-3.

Sowailem, Mohammed Y. S., et al., "Impact of Chromatic Dispersion Compensation in Single Carrier Two-Dimensional Stokes Vector Direct Detection System", IEEE Photonics Journal, vol. 9, No. 4, 2017 IEEE, Aug. 2017, 1-11.

Yamazaki, Hiroshi, et al., "300-Gbps Discrete Multi-tone Transmission Using Digital-Preprocessed Analog-Multiplexed DAC with Halved Clock Frequency and Suppressed Image", 42nd European Conference and Exhibition on Optical Communications, Düsseldorf, Sep. 18-22, 2016, 25-27.

Zhong, Kangping, et al., "Experimental study of PAM-4, CAP-16, and DMT for 100 Gb/s Short Reach Optical Transmission Systems", Optics Express, vol. 23, No. 2, 2015 OSA, Jan. 26, 2015, 1176-1189.

\* cited by examiner

OPTIMUM THREE DIMENSIONAL CONSTELLATIONS FOR OPTICAL INTERCONNECTS EMPLOYING STOKES VECTOR RECEIVERS

TECHNICAL FIELD

The present application relates generally to optical transmitters and receivers, and more particularly relates to optical transmitter and receiver devices using polarization multiplexing.

BACKGROUND

In today's cloud-centric society, datacenter (DC) traffic is growing relentlessly. It is predicted to reach 15 Zettabytes by 2020 according to Cisco Global Cloud Index; a two-fold increase from 2017. Nearly 77% of the DC traffic stays inside the DC local network, this intra-DC traffic being generated from storage, production, development and authentication of data. The immense intra-DC traffic growth requires fast, inexpensive, and power-efficient intra-DC optics operating over single mode fiber (SMF) links from 500 m to 10 km.

Recent literature discusses modulation/detection schemes that are proposed to bridge the gap between legacy direct detection (DD) and spectrally efficient coherent detection by combining the advantages of both worlds. In order to be cost, power and spectrally efficient, these schemes typically avoid the use of extensive digital signal processing (DSP) and a local oscillator laser as in a coherent detection scheme, while being able to achieve higher spectral efficiency compared to legacy DD. Instead, these schemes rely on signal self-beating or beating between the signal and a co-received CW laser tone as well as a set of simpler DSP functions compared to a coherent receiver DSP stack. The key to achieving higher spectral efficiency compared to DD is utilizing multiple signal dimensions or degrees of freedom that are available on the electric field of the propagating lightwave inside the single mode fiber (e.g., polarization). More specifically, these multi-dimensional modulation/detection schemes exploit up to four dimensions that are available per lightwave (carrier). These available dimensions are explained clearly hereafter.

Optical fields can be fully represented vectorially in either Jones or Stokes spaces. The Jones space is a two dimensional (2D) complex space in which the two dimensions represent a pair of orthogonal state of polarizations (SOPs). An optical field can be fully represented by a 2D complex valued Jones vector E whose two arguments represent the complex field components in both dimensions (or SOPs). The 2D Jones vector is written as $$E[n] = \begin{bmatrix} E_{\hat{x}}[n] \\ E_{\hat{y}}[n] \end{bmatrix} = \begin{bmatrix} \text{Re}\{E_{\hat{x}}[n]\} + jIm\{E_{\hat{x}}[n]\} \\ \text{Re}\{E_{\hat{y}}[n]\} + jIm\{E_{\hat{y}}[n]\} \end{bmatrix} = \quad (1)$$

$$e^{j\phi_{\hat{y}}[n]} \begin{bmatrix} |E_{\hat{x}}[n]|e^{j(\phi_{\hat{x}}[n]-\phi_{\hat{y}}[n])} \\ |E_{\hat{y}}[n]| \end{bmatrix}$$

which contains amplitude ($|E_{\hat{x}}[n]|$ and $|E_{\hat{y}}[n]|$) and phase ($\phi_{\hat{x}}[n]$ and $\phi_{\hat{y}}[n]$) information on both polarizations at time index n. Clearly, the Jones vector contains four degrees of freedom available per lightwave (carrier) for modulation and detection: the amplitudes and phases on both polarizations or equivalently the real (in-phase) and imaginary (quadrature) parts of the electric field on both polarizations. A dual-polarization in-phase and quadrature (DP-QM) modulator allows modulating all four degrees of freedom and a coherent receiver gives access to detecting all said dimensions.

On the other hand, the Stokes space is a three-dimensional (3D) real-valued space in w each dimension represents the difference in optical power after the dual-polarization optical field is passed through different pairs of orthogonal polarizers. The first dimension is the difference in optical power after the field passes through two linear horizontal and vertical polarizers, the second is after linear polarizers aligned at +45° and −45°, and the third is after right hand and left hand circular polarizers. A 3D Stokes vector S is defined as $$S[n] = \begin{bmatrix} S_1 \\ S_2 \\ S_3 \end{bmatrix} = \begin{bmatrix} |E_{\hat{x}}[n]|^2 - |E_{\hat{y}}[n]|^2 \\ 2\text{Re}\{E_{\hat{x}}[n]E_{\hat{y}}^*[n]\} \\ -2\text{Im}\{E_{\hat{x}}[n]E_{\hat{y}}^*[n]\} \end{bmatrix} = \quad (2)$$

$$\begin{bmatrix} |E_{\hat{x}}[n]|^2 - |E_{\hat{y}}[n]|^2 \\ 2|E_{\hat{x}}[n]||E_{\hat{y}}[n]|\cos(\phi_{\hat{x}}[n] - \phi_{\hat{y}}[n]) \\ -2|E_{\hat{x}}[n]||E_{\hat{y}}[n]|\sin(\phi_{\hat{x}}[n] - \phi_{\hat{y}}[n]) \end{bmatrix}$$

where the superscript * denotes the complex conjugate operator, and Re{ } and Im{ } denote the real and imaginary parts of the quantity inside the curly brackets. In addition to the three Stokes parameters in Eq. (2), a fourth parameter, $S_0 = (S_1^2 + S_2^2 + S_3^2)^{1/2} = |E_{\hat{x}}[n]|^2 + |E_{\hat{y}[n]}|^2$ representing the total power on both polarizations, is often appended to the 3D vector in Eq. (2), giving a four-dimensional (4D) Mueller vector $V[n]=[S_0 \ S_1 \ S_2 \ S_3]^T$, where $[\ ]^T$ denotes the transpose operator.

As clearly depicted by Eq. (2), a Stokes vector does not contain the absolute phase information of the field on both polarizations ($\phi_{\hat{x}}[n]$ and $\phi_{\hat{y}}[n]$), due to the complex conjugation involved in obtaining all Stokes parameters. By examining carefully the Stokes vector S in Eq. (2), we notice three DOF are readily available for modulation on a single wavelength, i.e., a single optical carrier generated by one laser source, which are the three Stokes parameters $S_1$, $S_2$ and $S_3$ that can be independently modulated and detected. Alternatively, one can also modulate $S_1$, $S_2$ and $S_3$ indirectly by modulating. 1) the intensity on $\hat{x}$, $|E_{\hat{x}}[n]|^2 = 0.5(S_0+S_1)$, 2) the intensity on $\hat{y}$, $|E_{\hat{y}}[n]|^2 = 0.5(S_0-S_1)$, and 3) the inter-polarization phase, $\phi_{\hat{x}}[n]-\phi_{\hat{y}}[n]=\angle E_{\hat{x}}[n]E^*_{\hat{y}}[n]=\angle(S_2+jS_3)$. A subset or all three DOF are modulated and directly detected by a Stokes vector receiver in multiple recent works.

Figure 1:
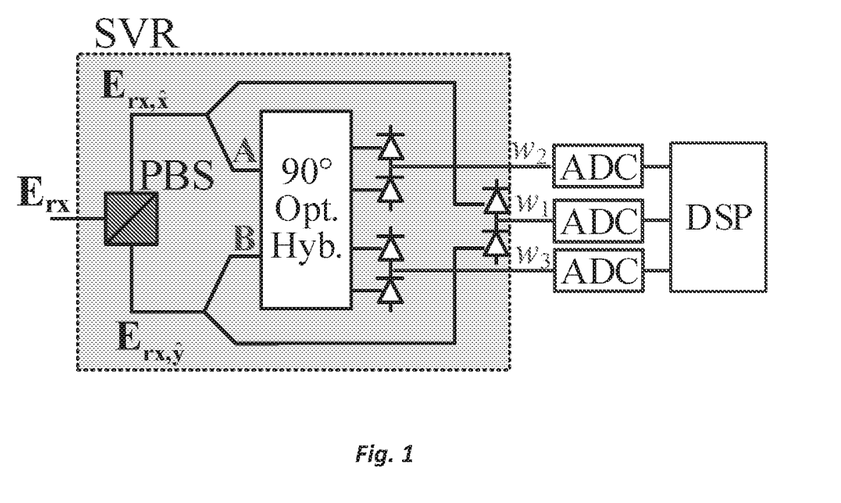
FIG. 1 illustrates an example Stokes Vector Receiver (SVR).

FIG. 1 depicts an example Stokes vector receiver (SVR) as implemented experimentally in multiple works. It comprises a polarization beam splitter (PBS) that first splits the incoming (received) field $E_{rx}$ into orthogonal polarizations. Each polarization is then split by means of a 67/33 power splitter into two portions; one portion (33% output) is fed to directly to a photodetector while the other (66% output) goes to a 90° optical hybrid. The two direct detected portions applied to a balanced photodetector produce an electrical photocurrent that is proportional to the first Stokes parameter $S_1$, as it directly depends on the power difference between the two polarizations $E_{r,x,\hat{x}}$ and $E_{r,x,\hat{y}}$. The four outputs of the hybrid, which mixes the input fields on input port A of the hybrid with phase shifted versions of the input field on input port B of the hybrid to achieve phase diversity, are also fed to two balanced photodetector pairs yielding the two photocurrents $w_2$ and $w_3$, which are directly proportional to $S_2$ and $S_3$, respectively.

In an optical fiber transmission system, the received field $E_{rx}$ (e.g., as shown as the input to the example SVR in FIG. 1) is an attenuated and distorted version of the transmitted field $E_{tx}$. For short-reach systems (<10 km) operating in the O band near the zero-dispersion wavelength (~1310 nm), fiber chromatic dispersion, polarization mode dispersion and fiber nonlinearity can be all neglected, leaving attenuation and polarization rotation as the only dominant signal impairments. The first impairment is inevitable and can be only compensated by means of optical amplifiers, though optical amplifiers are undesirable power consuming components in short-reach systems. On the other hand, polarization rotation is due to random fiber birefringence and must be mitigated.

This polarization rotation manifests itself as a linear transformation in either Jones or Stokes spaces. In the Jones space, one can write the received optical field in terms of the transmitted field as $E_{rx}=JE_{tx}$ where J is a random 2×2 complex-valued unitary matrix with the property $J^H J=I$ where I is the identity matrix. Similarly, in the Stokes space, $S_{rx}=RS_{tx}$ where R is a random 3×3 real-valued matrix. To recover $S_{tx}$ from $S_{rx}$, which is available from the three output photocurrents $w_1$, $w_2$, $w_3$ of an SVR, digital signal processing (DSP) has to be performed in order to invert the random crosstalk between the three underlying signal dimensions caused by the matrix R left-multiplying St, during transmission. Hence, three analog-to-digital converters (ADCs) need to be employed to digitize $w_1$, $w_2$, $w_3$ for subsequent DSP (see FIG. 1). Multiple-input multiple-output (MIMO) filters have been proposed and experimentally demonstrated to achieve polarization de-rotation post an SVR in recent works, such as M. Morsy-Osman et al., "1λ×224 Gb/s 10 km Transmission of Polarization Division Multiplexed PAM-4 Signals Using 1.3 μm SiP Intensity Modulator and a Direct-Detection MIMO-based Receiver," ECOC 2014, paper PD.4.4. The operation of the MIMO DSP is not the main concern of this disclosure, however, and the reader is referred to M. Chagnon, M. Morsy-Osman and D. V. Plant, "Half-Terabit Single-Carrier Direct-Detect Transceiver, Formats, and DSP: Analysis and Demonstration," in *Journal of Lightwave Technology*, vol. 36, no. 2, pp. 447-459, Jan. 15, 2018, for more details about the MIMO DSP architecture as well as the algorithms used to adapt the taps of the MIMO filters for different modulation schemes that employ an SVR. Without loss of generality, the discussion hereinafter will adopt the ideal case of R=I, thus assuming the MIMO DSP achieves perfect polarization de-rotation.

Despite these reported techniques, there still remains a need for cost-effective systems that transmit at data rates well beyond 100 Gbps, on a single wavelength.

SUMMARY

The present disclosure presents a framework for obtaining optimum three dimensional signal constellations for optical short-reach interconnects employing Stokes vector direct detection receivers (SVRs). These optimum constellations achieve the maximum constellation figure of merit (CFM), that is the ratio between the squared minimum Euclidean distance and the average power (second moment) of the signal constellation points. Compared to existing formats with alphabet size of 16, e.g. dual-polarization 4-level DP-PAM4, the proposed optimized 16-point 3D constellation achieves 4 dB improved SNR efficiency, i.e. 4 dB less received average optical power required when using an SVR for signal detection while delivering the same spectral efficiency. Similarly, the optimized 64-point 3D constellation achieves 6 and 3 dB improved SNR efficiency compared to DP-PAM8 and DP-PAM4-4PM formats, respectively, when an SVR is used for signal detection while delivering similar spectral efficiency. These optimized constellations are particularly important for SVR-based systems since they improve significantly the otherwise poor receiver sensitivity of SVRs, a widely known disadvantage of SVRs due to the large losses from many passive components required to realize an SVR. More interestingly, when using the proposed optimized 3D constellations, SVRs achieve better or similar SNR efficiency compared to a simple but unpractical dual-polarization receiver relying on an actively controlled optical polarization controller followed by a polarization beam splitter and two simple photodetectors (2D receiver). Further gains from the optimized constellation shaping can be expected when going to larger signal constellations and more signal dimensions.

Embodiments of the presently disclosed techniques and apparatuses include an improved optical modulation apparatus that comprises a first optical input configured for optical coupling to an output of a laser and a first optical output configured for optical coupling to an optical fiber. The optical modulation apparatus further comprises first, second, and third optical modulators having respective optical inputs, respective optical outputs, and respective analog inputs configured to receive respective modulating signals. These first, second, and third optical modulators are arranged so as to collectively modulate light coupled into the first optical input in all three dimensions of the three-dimensional Stokes vector space, to produce an optical output signal at the first optical output. The optical modulation apparatus further comprises a modulating circuit having a digital input configured to receive digital data and having first, second, and third analog outputs electrically coupled to the analog inputs of the first, second, and third optical modulators and configured to generate first, second, and third modulating signals for driving the first, second, and third optical modulators so as to map the digital data to an M-point optical constellation in the optical output signal. The points in the M-point optical constellation are distributed in the three-dimensional Stokes vector space such that the constellation figure of merit for the M-point optical constellation is high. In some embodiments, for example, the constellation figure of merit is at least half of the maximum achievable constellation figure of merit for M points in the three-dimensional Stokes vector space.

Other embodiments of the techniques and apparatus disclosed herein include an optical receiver apparatus, which comprises a Stokes vector receiver having an optical input configured to be coupled to an optical fiber. The Stokes vector receiver is configured to generate sampled data corresponding to the S1, S2, and S3 Stokes parameters of an optical signal received via the optical input. The optical receiver apparatus further comprises a digital processing circuit configured to demodulate digital data from the sampled data according to a modulation alphabet corresponding to an M-point optical constellation in the optical output signal. As discussed herein, the points in the M-point optical constellation are distributed in the three-dimensional Stokes vector space such that the constellation figure of merit for the NI-point optical constellation is high. In some embodiments, for example, the constellation figure of merit is at least half of the maximum achievable constellation figure of merit for NI points in the three-dimensional Stokes vector space, Of course, the present invention is not limited to the above features. Those of ordinary skill in the art will recognize additional features and advantages of the disclosed techniques and apparatus upon reading the following detailed description, and upon viewing the accompanying drawings.

DETAILED DESCRIPTION

Various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Aspects of the invention may be described below in terms of sequences of actions or functions to be performed by elements of a computer system or other hardware capable of executing programmed instructions. It will be recognized that the various actions could be performed by specialized circuits, by program instructions being executed by one or more processors, or by a combination of both.

In some alternate implementations, the functions/acts may occur out of the order noted in the sequence of actions.

The present disclosure is concerned with finding the optimum three-dimensional signal constellation in the Stokes space (in terms of SNR efficiency), or in other words, obtaining the most power efficient signal alphabet (finite set from which the 3D transmitted vectors are drawn) for modulating the Stokes vector $S_{tx}$ such that successful signal detection based on a noisy received Stokes vector $S_{rx}$ is achieved. Obtaining an optimum 3D M-ary constellation (alphabet size of $N!$ leading to bits encoded per 3D symbol) leads to an improved receiver sensitivity of an SVR. This is a particularly important problem since SVRs are widely known to have poor receiver sensitivity due to the large losses encountered in all passive components that realize an SVR (PBS, splitters, hybrid). Also, given the importance of trying to avoid the use of optical amplification in short-reach intra-datacenter interconnects, the improved SNR efficiency of optimum 3D constellations is highly desirable and will make SVR-based systems potentially more competitive in this application space.

To illustrate the significance of the currently disclosed techniques, four signal constellations previously employed in optical transmission systems are discussed as examples and visualized in the 3D Stokes space to show the underlying reason for their poor signal-to-noise ratio (SNR) efficiency. The first modulation format is dual-polarization On-Off Keying (DP-OOK) which is a direct extension of legacy single-polarization OOK to exploit both field polarizations and double the spectral efficiency. DP-OOK allows encoding two bits per transmitted symbol as opposed to only one bit per symbol for OOK.

Figure 2:
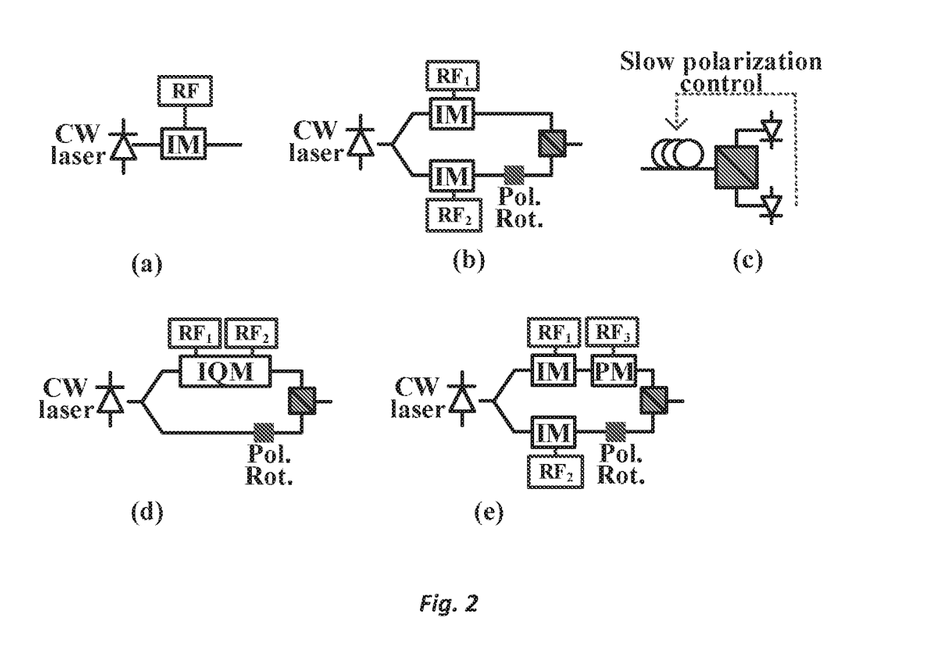
FIG. 2 illustrates several example optical transmitter architectures and a receiver architecture.
Figure 3:
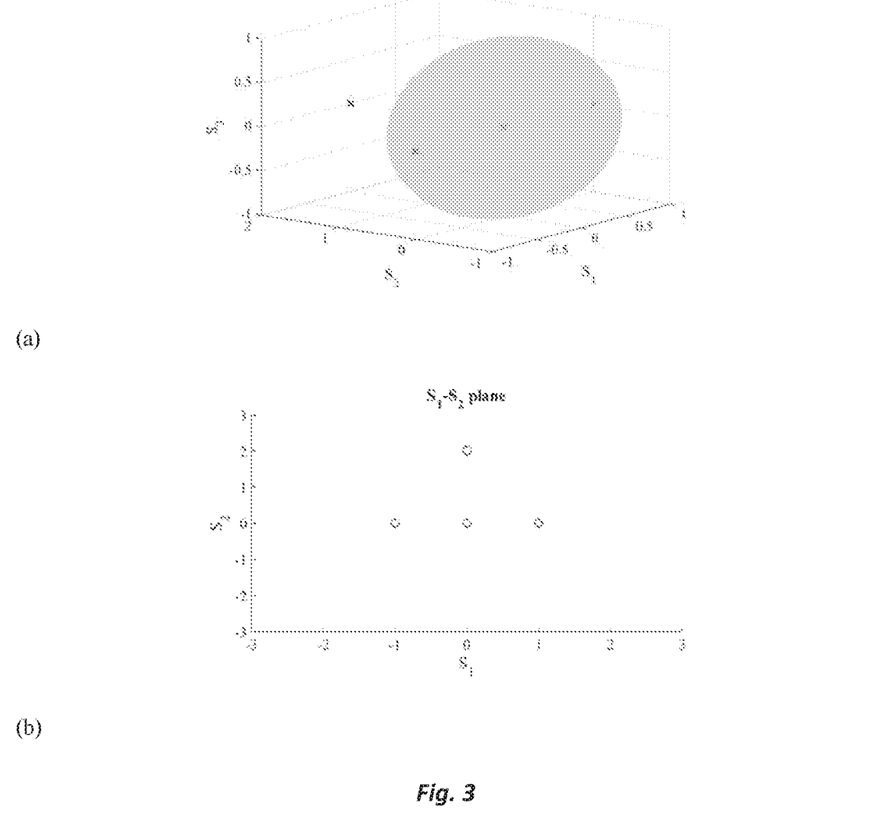
FIG. 3 illustrates the mapping of the dual-polarization on-off keying (DP-OOK) constellation to the 3D Stokes space.

The transmitter architecture for a DP-OOK modulator is shown in FIG. 2(*b*) compared to that of a single polarization OOK transmitter in FIG. 2(*a*). Using an intensity modulator (IM) for each of the transmitted orthogonal polarizations, DP-OOK encodes one information bit in the intensity per transmitted polarization with bit '1' corresponding to maximum intensity and bit '0' corresponding to minimum intensity (ideally zero if the IM has infinite extinction ratio). As shown in M. Morsy-Osman et al., "1λ×224 Gb/s 10 km Transmission of Polarization Division Multiplexed PAM-4 Signals Using 1.3 µm SiP Intensity Modulator and a Direct-Detection MIMO-based Receiver," ECOC 2014, paper PD.4.4, an SVR enables the detection of a DP-OOK signal in the presence of polarization rotation by means of simple MIMO DSP. This SVR-based detection is advantageous compared to a more classic receiver, e.g., as shown in FIG. 2(*c*), which comprises two photodetectors (PDs) following a PBS, since such a receiver requires an actively controlled optical polarization controller preceding the PBS to ensure proper optical polarization demultiplexing, rather than performing it in DSP after an SVR, The DSP polarization demultiplexing following SVR is the preferred solution, since it realizes a more stable receiver that is independent of the received polarization state and that can track fast polarization transients that might take place along the fiber channel due to any vibrations or environmental effects Though an SVR-based approach has the advantage of polarization independence, it has a poor SNR efficiency. The main fundamental reason of poor SNR efficiency of the DP-OOK format if detected by an SVR can be concluded by visualizing the constellation points ($2^2$=4 possibilities for the DP-OOK format) in the Stokes space, as shown in FIG. 3(*a*), which shows DP-OOK constellation points in the 3D $S_1$-$S_2$-$S_3$ space. The grey sphere in the figure is the unit sphere, denoted the Poincare sphere. All four points of the DP-OOK constellation lie in the $S_1$-$S_2$ plane, and the third dimension $S_3$ is left unmodulated (though still detected by an SYR), which is confirmed by the four points re-drawn in the $S_1$-$S_1$ plane in FIG. 3(*b*). Clearly this is not the most efficient way to place four points in a 3D space, since it does not fully utilize all dimensions. There are other more efficient ways to form a 4-ary 3D constellation in which the four points will be more spaced from each other, i.e. a constellation with a larger minimum distance, given the same average power constraint.

The situation is even clearer for a more dense constellation such as DP-PAM4. This modulation format, which can be generated using the transmitter shown in FIG. 2(b), achieves a constellation entropy of 4 bits per 3D symbol (2 bits per symbol for each PAM4 symbol on every polarization). The DP-PAM4 constellation is visualized in FIG. 4 in the 3D Stokes space, showing $4^2=16$ points, all lying in the $S_1$-$S_2$ plane. Similar to DP-OOK, these 16 points could be better positioned in the 3D space to achieve a better SNR efficiency while preserving the same spectral efficiency, by optimizing the modulation format.

Figure 5:
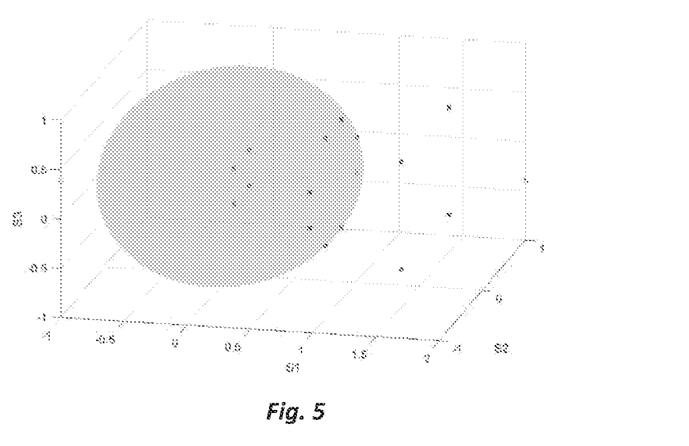
FIG. 5 shows the mapping of the 16QAM+C constellation to the 3D Stokes space.

A third modulation format that has been previously demonstrated also uses an SVR for signal detection employs complex in-phase and quadrature modulation in one polarization and transmits a copy of the CW laser on the other polarization. Such QAM+C formats can be generated by the transmitter architecture shown in FIG. 2(d). FIG. 5 shows 16QAM+C constellation points in the 3D Stokes space. We can still notice that this format, which achieves a similar entropy of 4 bits per 3D symbol similar to DP-PAM4, still does not use efficiently the full 3D space.

Figure 6:
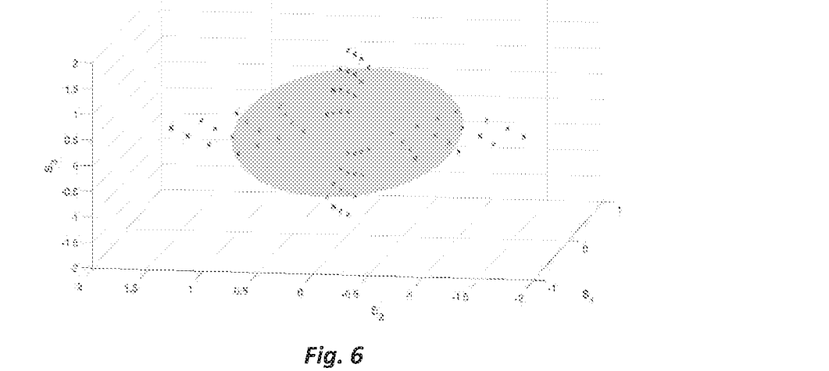
FIG. 6 shows the mapping of the DP-PAM4-4PM constellation to the 3D Stokes space.

Finally, similar observations can also be made about a fourth format, namely the DP-PAM4-4PM modulation, which can be generated using the transmitter architecture in FIG. 2(e). This format delivers 6 bits per 3D symbol, and thus has 64 possible states, i.e., constellation points, which are depicted in the 3D Stokes space in FIG. 6. This modulation constellation can be visualized as four copies of 16 similar states to DP-PAM4 at four different angles in the $S_2$-$S_3$ plane. This format does not achieve the largest possible spacing between all points and hence does not achieve the best SNR efficiency.

The following discussion presents a framework for obtaining optimum three dimensional signal constellations for optical short-reach interconnects employing Stokes vector direct detection receivers (SVRs). These optimum constellations achieve the maximum constellation figure of merit (CFM), that is the ratio between the squared minimum Euclidean distance and the average power (second moment) of the signal constellation points. Compared to existing formats with alphabet size of 16, e.g. dual-polarization 4-level DP-PAM4, the proposed optimized 16-point 3D constellation achieves 4 dB improved SNR efficiency, i.e. 4 dB less received average optical power required when using an SVR for signal detection while delivering the same spectral efficiency. Similarly, the optimized 64-point 3D constellation achieves 6 and 3 dB improved SNR efficiency compared to DP-PAM8 and DP-PAM4-4PM formats, respectively, when an SVR is used for signal detection while delivering similar spectral efficiency. These optimized constellations are particularly important for SVR-based systems since they improve significantly the otherwise poor receiver sensitivity of SVRs, a widely known disadvantage of SVRs due to the large losses from many passive components required to realize an SVR. More interestingly, when using the proposed optimized 3D constellations, SVRs achieve better or similar SNR efficiency compared to a simple but unpractical dual-polarization receiver relying on an actively controlled optical polarization controller followed by a polarization beam splitter and two simple photodetectors (2D receiver). Further gains from the optimized constellation shaping are expected when going to larger signal constellations and more signal dimensions Use of the optimum 3D constellations is particularly important for short-reach optical interconnects employing Stokes vector receivers (SVRs), since these constellations improve significantly the otherwise poor receiver sensitivity of SVRs, a widely known disadvantage of SVRs due to losses from the several passive components required to realize an SVR.

In an SVR, the three received photocurrents represent noisy signals that are proportional to the received Stokes parameters of the received light. If it is assumed for the sake of simplicity that the MIME DSP achieves perfect polarization derotation, the received 3D vector can be written in terms of the transmitted Stokes vector as $S_{rx}=S_{tx}+N$, where N is a 3D vector containing multi variate white Gaussian noise process with zero mean vector and a covariance matrix $\sigma^2 I$ (independent noise on each dimension). This received signal model assumes all the additive noise originates from the photodetection process including thermal and shot noises but assumes no optical noise (e.g. from optical amplification) incoming with the received light. This model is particularly appropriate in the short-reach scenario where receiver noise dominates any optical noise since very few or no optical amplifiers are employed.

Figure 7:
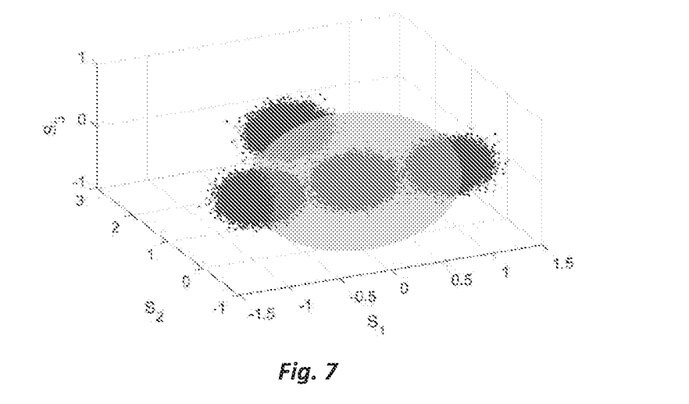
FIG. 7 illustrates a noisy received DP-OOK constellation.

Geometrically speaking, this 3D noise manifests itself in the 3D Stokes space by a spherical cloud around each designated constellation point. FIG. 7 illustrates a noisy received DP-OOK constellation, where small spheres whose centers are at the designated points in the transmitted constellation are observed. To perform hard decisions per every received symbol, we employ a minimum Euclidean distance criterion in the 3D space, i.e. we decide a symbol I is transmitted based on $$\underset{i\in\{1,2,\ldots,M\}}{\mathrm{argmin}}\{\|S_{rx}-S_i\|^2\}.$$

Clearly, the larger the minimum distance the constellation is, the more noise it can tolerate. Thus, a better SNR efficiency is obtained by increasing the minimum distance of the employed constellation because a lower symbol error rate (less errors in decisions) will be made at a given SNR or equivalently less SNR will be required to achieve the same symbol error rate. A constellation figure of merit, CFM, is defined as the ratio between the squared minimum distance and the average power of the constellation points, i.e. $\mathrm{CFM}=d_{min}^2/P_{av}$, which is a dimensionless quantity. An optimum modulation format is the one that maximizes CFM, since it maximizes $d_{min}$ for a given $P_{av}$. Two approaches can be used to obtain the optimum M-point 3D constellations with maximum CFM: i) a geometric approach, and ii) an optimization-based approach.

The geometric approach for finding optimum 3D constellations makes use of the geometry of the problem and uses well-known results for an equivalent problem in solid geometry. The problem of maximizing CFM is equivalent to packing small M spheres with equal radii in a container in 3D space. The M spheres represent the noisy received symbols belonging to all M symbols in the constellation and their radii are equal because additive white Gaussian noise for every transmitted symbol has the same variance, i.e. it is data independent. The large container in which the M spheres need to be packed represents the average power constraint. The densest possible packing of these M spheres inside the container represents the optimum 3D Mary constellation as it maximizes the packing density (~74% is the greatest theoretically achievable packing density or volume occupied by spheres relative to the full container's volume) which leads to the largest possible minimum distance between the symbols (or spheres).

Figure 8:
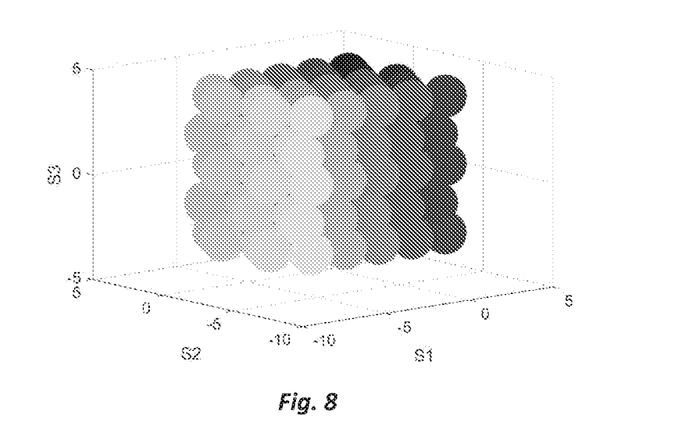
FIG. 8 illustrates a hexagonal close-packed (HCP) lattice with size 125.

Another way to explain the equivalence between the two problems is by realizing that the maximum packing density allows having biggest possible non-touching spheres (with largest radii) within the container, i.e. allows for largest amount of noise for a given signal power constraint without overlap between neighboring spheres. It is well known that hexagonal close packed (HCP) and face centered cubic (FCC) lattices achieve this theoretical maximum packing density. FIG. 8 shows an HCP lattice with size of $5^3=125$. Generally the (x,y,z) coordinates of the spheres' centers, each with radius r, in an HCP lattice can be found as follows:

$$\begin{bmatrix} x \\ y \\ z \end{bmatrix} = \begin{bmatrix} 2i + (j+k) \bmod 2 \\ \sqrt{3}\left[j + \frac{1}{3}(k \bmod 2)\right] \\ \frac{2\sqrt{6}}{3}k \end{bmatrix} r \text{ where} \quad (3)$$

$$i, j, k \in \{ \ldots, -2, -1, 0, 1, 2, \ldots \}$$

Figure 4:
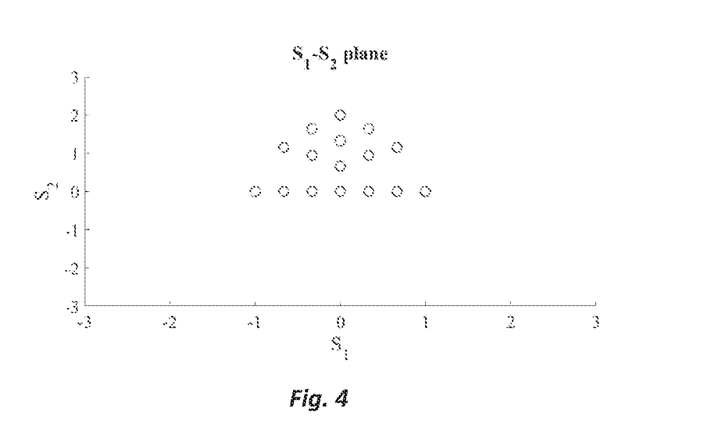
FIG. 4 shows the mapping of the dual-polarization 4-level pulse-amplitude modulation (DP-PAM4) constellation to the 3D Stokes space.
Figure 9:
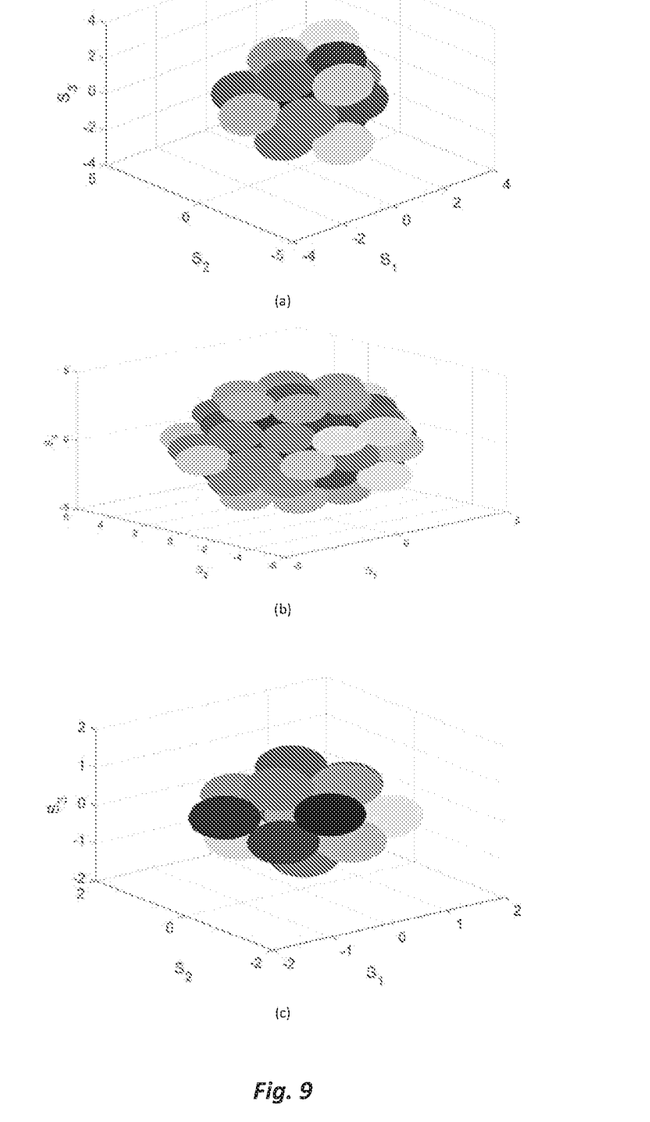
FIG. 9 show example constellations according to embodiments of the present invention.

The procedure of generating any HCP lattice constellation with arbitrary size M is to generate first an HCP lattice constellation with size $$(\lceil \sqrt[3]{M} \rceil)^3,$$

where $\lceil x \rceil$ denotes the nearest integer larger than x, and then choose the first M points with the lowest powers. As an example, a 16-point HCP constellation is generated from a 27-point lattice by taking the 16 symbols with lower powers (smaller distances from origin). FIGS. 9(*a*) and (*b*) show 16- and 64-point HCP lattice constellations for which CFM=0.904 and 0.345, respectively. For comparison purposes, the DP-PAM4 constellation in FIG. 4 has CFM=0.087, which is much lower than that of the optimized 16-point HCP constellation. This leads to a large performance gap in SNR sensitivity between both 16-point constellations (DP-PAM4 and 16-point HCP), even though both constellations can achieve the same entropy of four bits per symbol.

In the optimization-based approach, the 'fmincon' function in the MATLAB optimization toolbox can be used to find the optimum 16-point constellation. The objective function to be minimized is the inverse of the squared minimum distance of the constellation. In addition. 'fmincon' is constrained to look for solutions with a fixed average power of unity. In a simulation, a random initialization was provided for 'fmincon', i.e., 16 points randomly distributed in the 3D space according to the uniform distribution. The final solution to which the function converges depends on the initialization vector, After several trials with different initialization vectors, the best outcome of 'fmincon' yielded an optimized 16-point constellation, with CFM=0.9, as shown in FIG. 9(*c*). The CFM obtained is very similar to that of the HCP lattice constellation obtained in the previous method, although the two constellations look entirely different.

Figure 10:
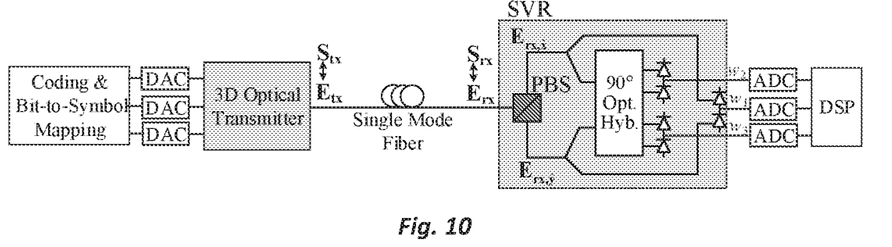
FIG. 10 illustrates an example short-range optical link system, according to some embodiments of the described techniques and apparatus.

FIG. 10 illustrates an example of a full short-reach optical interconnect that employs the proposed optimum three dimensional M-point signal constellations. The transmitter comprises an application-specific integrated circuit (ASIC) that first carries out necessary bit-to-symbol mapping (from binary bits to 3D symbols depending on the employed constellation) and any coding that might be used. This coding and bit-to-symbol mapping circuitry is followed by three digital-to-analog converters that convert the three digital waveforms into analog drive signals that drive a subsequent 3D optical transmitter. To generate a signal using any of the optimum 3D constellations discussed above, the three waveforms driving the 3D optical transmitter need to be set to shape the output modulated light. The exact calculation of the three desired driving waveforms depends on the detailed architecture of the 3D optical transmitter and h v it modulates the Stokes vector $S_{tx}$, as discussed in further detail below.

Returning to the system illustrated in FIG. 10, the transmitted (modulated) light is then transmitted along a short single mode fiber (SMF) link (<10 km), The carrier center wavelength of the transmitted light is chosen in the O band of operation, which has a center wavelength of 1310 nm, because SMF has minimal dispersion effects in this window of operation.

The received signal ($E_{rx}$ in Jones space or equivalently $S_{rx}$ in Stokes space) is then detected via an SVR. It comprises a polarization beam splitter (PBS) that first splits the incoming (received) field $E_{rx}$ into orthogonal polarizations. Each polarization is then split by means of a $^{67}/_{33}$ power splitter into two portions; one portion (33% output) is fed to directly to a photodetector while the other (66% output) goes to a 90° optical hybrid. The two direct detected portions applied to a balanced photodetector gives the electrical photocurrent $w_1$ that is proportional to the first Stokes parameter $S_1$ as it directly depends on the power difference between the two polarizations $E_{rx,\hat{x}}$ and $E_{rx,\hat{y}}$. The four outputs of the hybrid, which mixes the input fields on one input port of the hybrid with phase shifted versions of the input field on the other input port of the hybrid to achieve phase diversity, are also fed to two balanced photodetector pairs yielding the two photocurrents $w_2$ and $w_3$ which are directly proportional to $S_2$ and $S_3$, respectively.

As discussed above, the short SMF channel in a typical intra-datacenter link will only cause power attenuation and random polarization rotation to the transmitted light, while other fiber impairments (e.g., polarization mode dispersion, Kerr nonlinearity) are negligible under these operating conditions. The random polarization rotation can be represented by either 2×2 or 3×3 linear transformations in the Jones or Stokes space, respectively. In the Jones space, one can write the received optical field in terms of the transmitted field as $E_{rx}=JE_{tx}$ where J is a random 2×2 complex-valued unitary matrix with the property $J^H J=I$ where I is the identity matrix. Similarly in the Stokes space, $S_{rx}=RS_{tx}$ where R is a random 3×3 real-valued matrix. In order to recover $S_{tx}$ from $S_{rx}$ that is available from the three output photocurrents $w_1$, $w_2$, $w_3$ of an SYR, digital signal processing (DSP) has to be performed, to invert the random crosstalk between the three underlying signal dimensions caused by the matrix R left-multiplying $S_{tx}$ during transmission. Hence, three analog-to-digital converters (ADCs) need to be employed to digitize $w_1$, $w_2$, $w_3$ for subsequent DSP (see FIG. 10). Multiple-input multiple-output (MIMO) filters have been proposed and experimentally demonstrated to achieve polarization de-rotation post an SVR in multiple recent works. The reader is referred to Chagnon, M. Morsy-Osman and D. V. Plant, "Half-Terabit Single-Carrier Direct-Detect Transceiver, Formats, and DSP: Analysis and Demonstration," in *Journal of Lightwave Technology*, vol. 36, no. 2, pp. 447-459, Jan. 15, 2018, for more details about the MIMO DSP architecture as well as the algorithms used to adapt the taps of the MIMO filters for different modulation schemes that employ an SVR. Without loss of generality, the ideal case of R=I is adopted for the discussion herein, which corresponds to an assumption that the MIMO DSP achieves perfect polarization derotation. It will be appreciated, of course, that perfect derotation is not a requirement for obtaining the benefits of the modulation constellations and the related techniques described herein.

Figure 11:
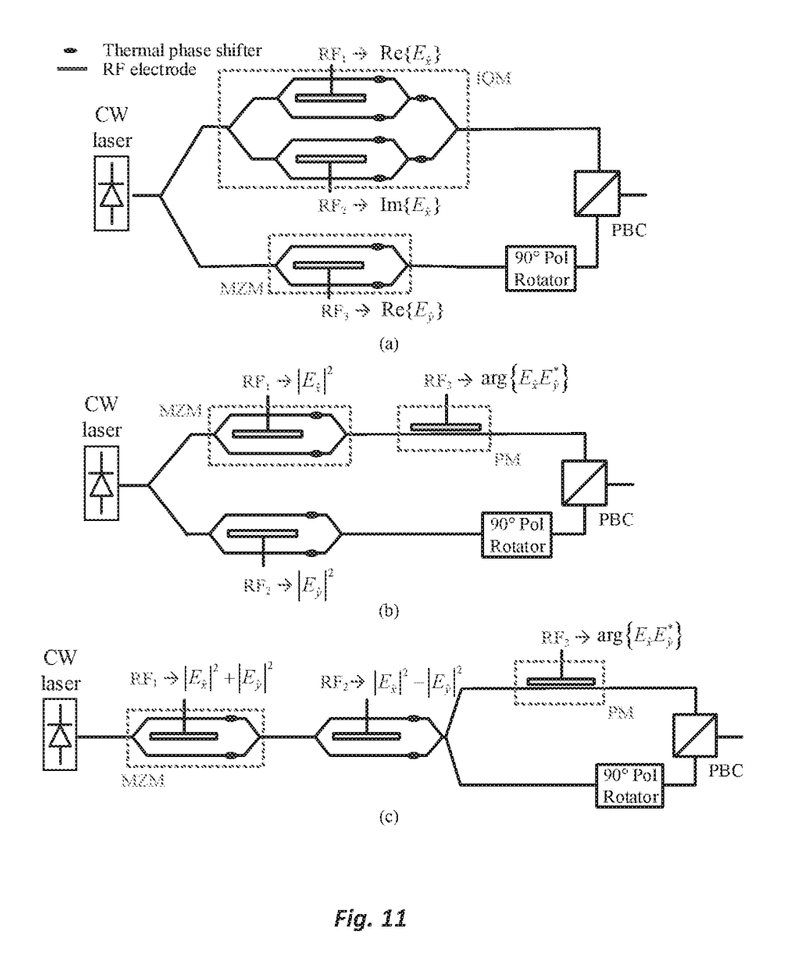
FIG. 11 illustrates example transmitter architectures according to embodiments.

FIG. 11 presents three possible structures of a 3D optical transmitter such as might be used in the overall system in FIG. 10. FIG. 11(a) illustrates an architecture that uses IQM on the X-polarization and MZ amplitude modulator on the Y-polarization, while FIG. 11(b) shows an architecture that uses two MZ intensity modulators on both polarizations and a phase modulator (PM) to modulate the inter-polarization phase. The architecture shown in FIG. 11(c) uses one MZ, intensity modulator to modulate total power $S_0$, followed by another MZ intensity modulator to modulate the power difference between X and Y polarizations, i.e. $S_1$, and inter-polarization PM.

In more detail, the first 3D transmitter in FIG. 11(a) comprises a single CW laser source whose is output is power split into two portions. One portion goes to an in-phase and quadrature modulator (IQM) that modulates its amplitude and phase, while the second portion goes to a single Mach-Zehnder (MZ) amplitude modulator that modulates its amplitude. The two portions are then combined using a polarization beam combiner (PBC), after one is rotated by 90°, such that they now form the two orthogonal polarizations of the transmitted Jones vector. In order to use this transmitter in FIG. 11(a) to generate any 3D constellation (e.g., the 16-point optimum 3D format in FIG. 9(a)), the 3D transmitted Stokes vectors $S_{tx}=[S_1,S_2,S_3]^T$ of all the constellation points must first be converted into their respective Jones vectors $E_{tx}=[E_{\hat{x}}\ E_{\hat{y}}]^T$. $E_{tx}$ is the eigenvector of the matrix $\vec{S}_{tx}\cdot\vec{\sigma}$ where $\vec{\sigma}$ is the Pauli spin vector in Stokes space. More explicitly, $E_{tx}$ is the eigenvector of the following 2×2 matrix $$S_{tx}\cdot\vec{\sigma} = \left(S_1\begin{bmatrix}1 & 0 \\ 0 & -1\end{bmatrix} + S_2\begin{bmatrix}0 & 1 \\ 1 & 0\end{bmatrix} + S_3\begin{bmatrix}0 & -j \\ j & 0\end{bmatrix}\right) \quad (4)$$

Next, the resulting $E_{\hat{x}}$ and $E_{\hat{y}}$ can be easily used to find the three driving radio frequency (RF) waveforms of the IQM and MZM on the X and Y polarizations of the transmitter in FIG. 11(a) as follows:

$RF_1=Re\{E_{\hat{x}}\}, RF_2=Im\{E_{\hat{x}}\}, RF_3=E_{\hat{y}}$ (real-valued).

Figure 12:
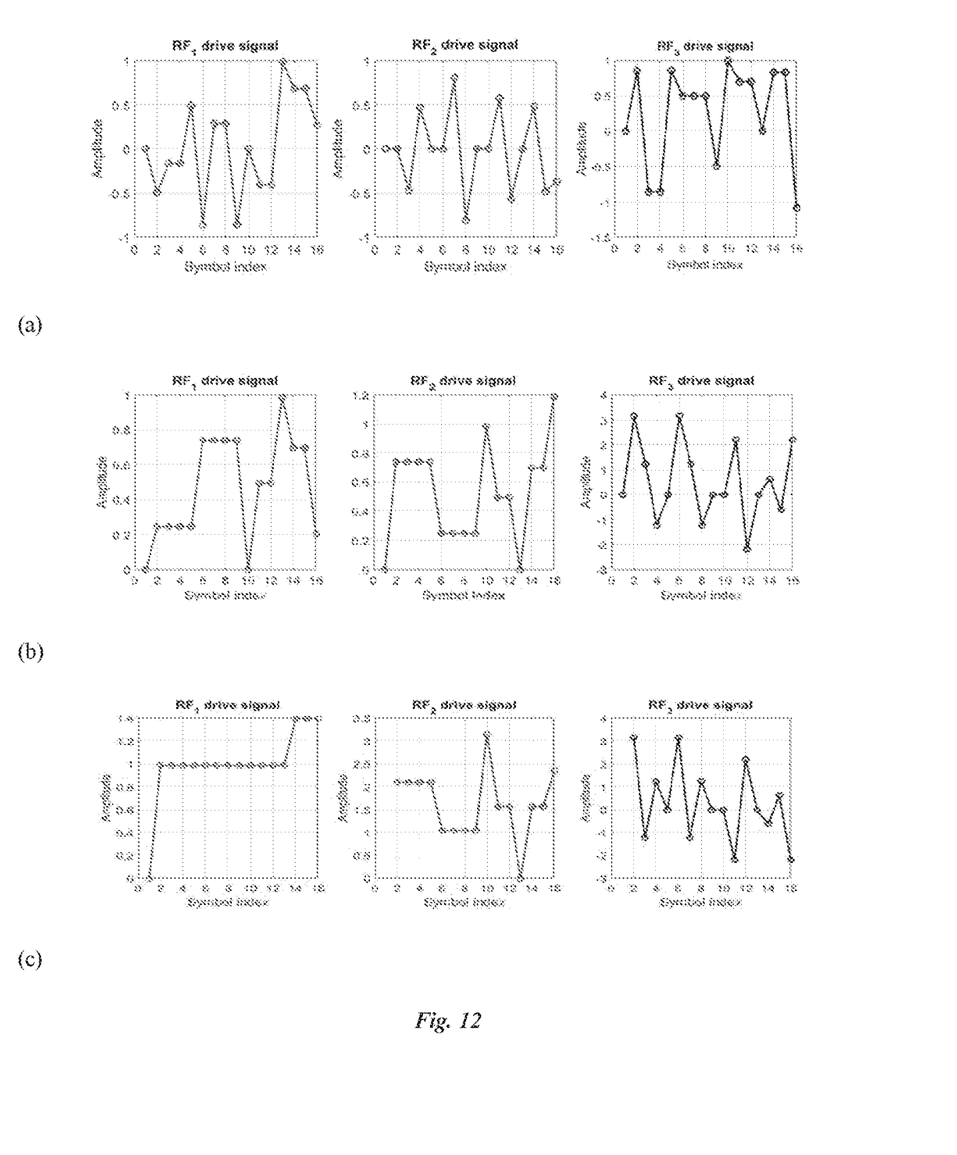
FIG. 12 shows example modulating signals corresponding to the architectures of FIG. 11, for 16-point constellation.

FIG. 12(a) shows all possible levels of the three waveforms required to generate the optimum 16-point HCP constellation in FIG. 9(a), using the transmitter in FIG. 11(a). It can be seen that 10, 10 and 8 level RE signals are required, respectively, for three RE waveforms $RF_1$, $RF_2$, $RF_3$ driving the 3D transmitter in FIG. 11(a).

Similarly, one can modulate the Stokes vector using the transmitter in FIG. 11(b), which utilizes two Mach-Zehnder modulators as intensity modulators (one per each polarization) and a phase modulator to modulate the phase difference between the two polarizations before finally combining the two modulated outputs using a PBC after one is rotated by 90°. For this transmitter and after converting from the desired Stokes vector to the corresponding Jones vector as per Eq. (3), the three driving RE waveforms required are $RF_1=|E_{\hat{x}}|^2, RF_2=|E_{\hat{y}}|^2, RF_3=arg\{E_{\hat{x}}E_{\hat{y}}^*\}$.

FIG. 12(b) shows the resulting three RE waveforms required to generate the optimum 16-point HCP constellation in FIG. 9(a) using the transmitter in FIG. 11(b). We notice that 7, 7 and 8 level RF signals are required, respectively, for the three RE waveforms $RF_1$, $RF_2$, $RF_3$ driving the 3D transmitter in FIG. 11(b).

Alternatively, one can use the transmitter architecture in FIG. 11(c), Which uses two cascaded MZ intensity modulators and a PM. The first MZ intensity modulator modulates the total power, i.e., $S_0$, whereas the second one modulates the power difference between the X and Y polarizations. One of the two output branches of the output 50:50 coupler of the second MZ interferometer is then applied to a PM to modulate the inter-polarization phase before combining using a PBC. The required RF waveforms in this case are shown in FIG. 12(c) where 3, 6, and 8 level RE signals are needed to drive this particular 3D transmitter. Comparing the three structures, the last structure in FIG. 11(c) has some advantages, compared to the others, since it requires RF signals with less number of levels and thus fewer DACs, with lower bit resolution, are needed to generate the RF signals.

Simulations have been performed on MATLAB to compare traditional un-optimized constellations (e.g. DP-PAM, and DP-PAM-PM) with the optimum 3D constellations described herein, in terms of SNR efficiency when using an SVR at the receiver. The received signal model discussed above is used, i.e., independent additive white Gaussian noise is added to the three photocurrents provided by an SVR to account for thermal and shot noises encountered during photodetection. All fundamental losses of optical components are taken into account, however, the excess loss is assumed zero.

Figure 13:
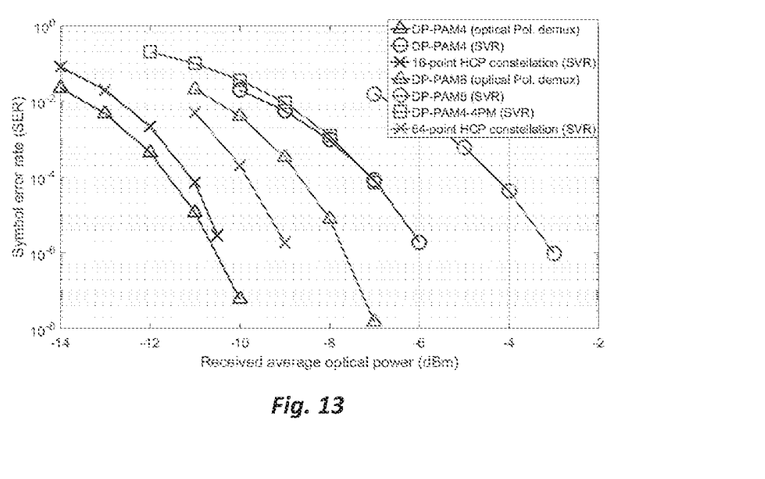
FIGS. 13 and 14 illustrate simulation results corresponding to example embodiments.

FIG. 13 depicts the symbol error rate versus average received optical power (at receiver PBS input) for different modulation formats. Decisions are made based on the minimum Euclidean distance metric. The left-most curve with triangle markers represents the system that uses DP-PAM4 modulation and the receiver shown in FIG. 2(c), relying on optical polarization demultiplexing via a polarization controller before the PBS, i.e. not using an SVR. The left-most curve having circle markers represents the system using DP-PAM4 modulation and an SVR whose architecture was shown in FIG. 1. The big power penalty (>4 dB) between the two systems is easily explained by the additional losses of all the passive components in an SVR, compared to the optical polarization demultiplexing based receiver. This makes the power available to the photodetectors in the receiver of FIG. 2(c) significantly more than that in the SVR of FIG. 1. To achieve the full potential of an SVR, the 3D space that is made available by the SVR must be efficiently used, e.g., by employing the optimum constellations (with maximum CFM) discussed above. The left-most curve that has cross markers represents the system using an SVR and the 16-point HCP lattice constellation in FIG. 7(a). Compared to the SYR based system using DP-PAM4, 4 dB of gain is obtained by using the optimum HCP constellation. Its performance is only 0.5 dB worse than the DP-PAM4 system with optical polarization demultiplexing receiver.

The situation is even better for 64-point constellations (6 bits per symbol). By comparing red curves with circle and triangle markers, the same 4 dB of power penalty due to using an SVR can be observed if un-optimized DP-PAM8 (with also 6 hits per symbol of entropy) is used. On the other hand, the optimized 64-point HCP lattice constellation of FIG. 7(b) performs even better by >1 dB than the optical demultiplexing based receiver (see the right-hand curve with cross markers). For comparison purposes, we also plot the performance of DP-PAM4-4PM format (right-hand curve with square markers), which also delivers an entropy of 6 bits per symbol, whose 3D constellation was shown in FIG. 6. We still see how the 64-point HCP constellation outperforms all other example modulation formats with entropy of 6 bit/symbol in terms of SNR efficiency.

Figure 14:
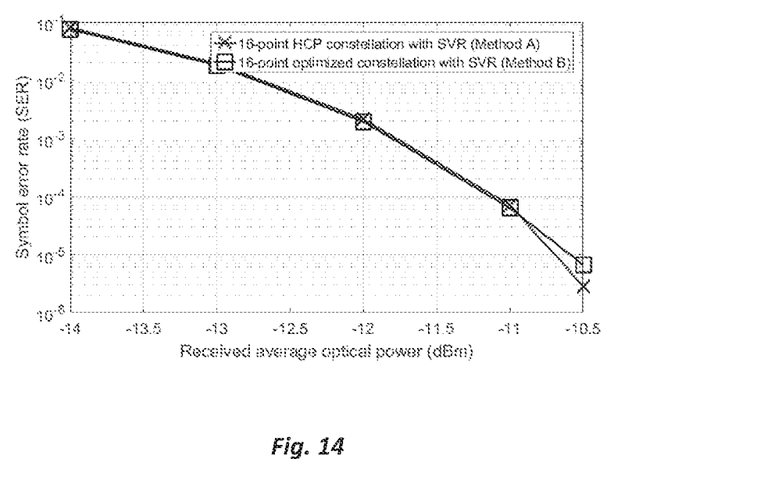
Figure 15:
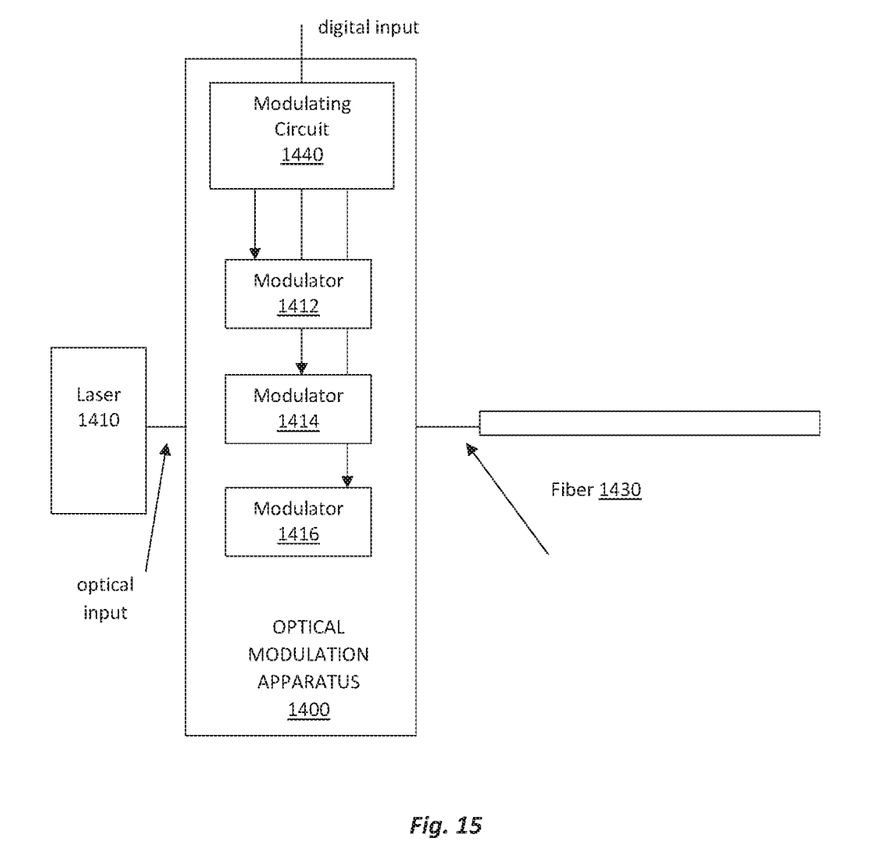
FIG. 15 is a block diagram illustrating an example optical modulation apparatus according to various embodiments described herein.

Next in FIG. 14, symbol error rate versus optical power is compared for optimum 3D 16-point constellations obtained from both methods explained in the former section (geometric and optimization-based methods). We can easily confirm both constellations achieve the same SNR efficiency due to their equal CFM, although their actual modulation alphabets are different.

While the above discussion discloses the design and use of optimal constellations for SVRs, it will be appreciated that achieving perfect optimality may not be practical, in all scenarios. It will be further appreciated, however, that significant benefits, in terms of SNR efficiency and symbol error rates, can be achieved with constellations that are less than perfectly optimal, but that have substantially better distribution of their constellation points in the 3D Stokes vector space, compared to conventional modulation constellations. This better distribution may be characterized by a constellation figure of merit, CFM, as defined above. Thus, for example, embodiments adopting the presently disclosed techniques may employ an M-point optical constellation in which the points in the M-point optical constellation are distributed in the three-dimensional Stokes vector space such that the constellation figure of merit for the M-point optical constellation equals at least half the maximum achievable constellation figure of merit for M points in the three-dimensional Stokes vector space. Other embodiments may find better performance by employing constellations where the points in the M-point optical constellation are distributed in the three-dimensional Stokes vector space such that the constellation figure of merit for the M-point optical constellation equals at least 90% of the maximum achievable constellation figure of merit for M points in the three-dimensional Stokes vector space.

In view of the detailed examples and explanation provided above, it will be appreciated that the modulation constellations described herein can be used to advantage in an optical link that utilizes a Stokes vector receiver (SVR). Several example transmitter architectures that can produce modulated optical signals using these modulation constellations are shown in FIG. 11. These should each be understand as example embodiments of an improved optical modulation apparatus is shown more generally in FIG. 14. The optical modulation apparatus 1400 comprises a first optical input configured for optical coupling to an output of a laser 1410, and a first optical output configured for optical coupling to an optical fiber 1430. The optical modulation apparatus 1400 further comprises first, second, and third optical modulators 1412, 1414, 1416, having respective optical inputs, respective optical outputs, and respective analog inputs configured to receive respective modulating signals. These first, second, and third optical modulators 1412, 1414, 1416 are arranged, e.g., as shown in FIGS. 11(a)-(c), so as to collectively modulate light coupled into the first optical input in all three dimensions of the three-dimensional Stokes vector space, to produce an optical output signal at the first optical output.

The optical modulation apparatus 1400 further comprises a modulating circuit 440 having a digital input configured to receive digital data and having first, second, and third analog outputs electrically coupled to the analog inputs of the first, second, and third optical modulators 1412, 1414, and 1416, and configured to generate first, second, and third modulating signals for driving the first, second, and third optical modulators so as to map the digital data to an M-point optical constellation in the optical output signal. As discussed above, the points in the M-point optical constellation are distributed in the three-dimensional Stokes vector space such that the constellation figure of merit for the M-point optical constellation equals at least half, for example, of the maximum achievable constellation figure of merit for M points in the three-dimensional Stokes vector space.

In some embodiments, the points in the M-point optical constellation are distributed more optimally in the three-dimensional Stokes vector space, e.g., such that the constellation figure of merit for the M-point optical constellation equals at least 90% of the maximum achievable constellation figure of merit for M points in the three-dimensional Stokes vector space.

As was shown above in the discussion of FIG. 11, the optical modulators 1412, 1414, 1416 may be arranged in any number of ways, provided only that the modulating circuit 1440 is configured to map the digital symbols to the Stokes vector space in a corresponding way. In some embodiments, for example, the optical modulators 1412, 1414, and 1416 may be configured in a manner like that shown in FIG. 11(a). In these embodiments, the optical modulation apparatus 1400 further comprises an optical splitter configured to split light coupled from the laser, via the first optical input, into first and second portions, and the first and second optical modulators 1412 and 1414 are in-phase and quadrature modulators configured to operate on the first portion of light, to generate an IQ-modulated optical signal. The third optical modulator 1416 in these embodiments is a Mach-Zender intensity modulator configured to operate on the second portion of light coupled, to generate an intensity-modulated optical signal. The optical modulation apparatus 1400 in these embodiments further comprises an optical combiner to combine the IQ-modulated optical signal and the intensity-modulated signal; the optical modulation apparatus is configured, e.g., using a polarization rotator as shown in FIG. 11(a), so that the IQ-modulated optical signal and the intensity-modulated signal have substantially orthogonal polarizations at the first optical output.

Other embodiments may use like an architecture similar to that shown in FIG. 11(b). In these embodiments, the optical modulation apparatus 1400 further comprises an optical splitter configured to split light coupled from the laser, via the first optical input, into first and second portions. The first and second optical modulators 1412 and 1414 in these embodiments are a Mach-Zender intensity modulator and an optical phase modulator configured to operate in series on the first portion of light, to generate an intensity- and phase-modulated optical signal, while the third optical modulator 1416 is a Mach-Zender intensity modulator configured to operate on a second portion of light coupled from the laser, to generate a second intensity-modulated optical signal. The optical modulation apparatus 1400 in these embodiments further comprises an optical combiner to combine the intensity and phase modulated optical signal and the second intensity-modulated signal; again, the optical modulation apparatus 1400 is configured so that the intensity and phase modulated optical signal and the second intensity-modulated signal have substantially orthogonal polarizations at the first optical output.

Still other embodiments may utilize an architecture like that shown in FIG. 11(*c*), where the first optical modulator 1412 is a Mach-Zender intensity modulator configured to modulate light from the first optical input, the second optical modulator 1414 is a Mach-Zender modulator configured to modulate the power difference between X- and Y-polarizations of light output from the first modulator, and the third optical modulator 1416 is a Mach-Zender intensity modulator configured to modulate a phase of the X-polarization or the Y-polarization of light output from the second optical modulator.

In some embodiments, the M-point constellation is a 16-point constellation, for example, with the points arranged according to a hexagonal-close-packed (HCP) lattice or face-centered cubic (FCC) lattice. Iii other embodiments, the M-point constellation is a 64-point constellation, with the points arranged according to a hexagonal-close-packed (HCP) lattice or face-centered cubic (FCC) lattice.

An optical transmitter according to the present disclosure may comprise any of the optical modulation apparatuses disclosed above, and may further comprise a laser having an output coupled to the first optical input.

Referring back to FIG. 10, it will be appreciated that the right-hand side of that figure illustrates an example of an optical receiver apparatus, the apparatus comprising a Stokes vector receiver having an optical input configured to be coupled to an optical fiber. The Stokes vector receiver is configured to generate sampled data corresponding to the S1, S2, and S3 Stokes parameters of an optical signal received via the optical input. The optical receiver apparatus shown in FIG. 10 further comprises a digital processing circuit (illustrated, as "DSP" in the figure), configured to demodulate digital data from the sampled data according to a modulation alphabet corresponding to an M-point optical constellation in the optical output signal. As discussed herein, the points in the M-point optical constellation are distributed in the three-dimensional Stokes vector space such that the constellation figure of merit for the M-point optical constellation equals at least half the maximum achievable constellation figure of merit for M points in the three-dimensional Stokes vector space.

In some embodiments, the optical receiver apparatus is configured to demodulate a 16-point constellation, with the points arranged according to a hexagonal-close-packed (HCP) lattice or face-centered cubic (FCC) lattice. In other embodiments, the optical receiver apparatus is configured to demodulate a 64-point constellation, with the points arranged according to a hexagonal-close-packed (HCP) lattice or face-centered cubic (FCC) lattice.

More generally, modifications and other embodiments of the disclosed inventions will come to mind to one skilled in the art having the benefit of the teachings presented in the foregoing descriptions and, the associated drawings. Therefore, it is to be understood that the presently disclosed inventions are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An optical modulation apparatus, comprising:
a first optical input configured for optical coupling to an output of a laser;
a first optical output configured for optical coupling to an optical fiber;
first, second, and third optical modulators having respective optical inputs, respective optical outputs, and respective analog inputs configured to receive respective modulating signals, wherein the first, second, and third optical modulators are arranged so as to collectively modulate light coupled into the first optical input in all three dimensions of the three-dimensional Stokes vector space, to produce an optical output signal at the first optical output; and
a modulating circuit having a digital input configured to receive digital data and having first, second, and third analog outputs electrically coupled to the analog inputs of the first, second, and third optical modulators and configured to generate first, second, and third modulating signals for driving the first, second, and third optical modulators so as to map the digital data to an M-point optical constellation in the optical output signal, the points in the M-point optical constellation being distributed in the three-dimensional Stokes vector space such that, given a constellation figure of merit defined as the ratio between the squared minimum distance and the average power of the constellation points, the constellation figure of merit for the M-point optical constellation equals at least half the maximum achievable constellation figure of merit for M points in the three-dimensional Stokes vector space.

2. The optical modulation apparatus of claim 1, wherein the points in the M-point optical constellation are distributed in the three-dimensional Stokes vector space such that the constellation figure of merit for the M-point optical constellation equals at least 90% of the maximum achievable constellation figure of merit for M points in the three-dimensional Stokes vector space.

3. The optical modulation apparatus of claim 1, wherein:
the optical modulation apparatus further comprises an optical splitter configured to split light coupled from the laser, via the first optical input, into first and second portions;
the first and second optical modulators are in-phase and quadrature modulators configured to operate on the first portion of light, to generate an IQ-modulated optical signal;
the third optical modulator is a Mach-Zender intensity modulator configured to operate on the second portion of light coupled, to generate an intensity-modulated optical signal;
the optical modulation apparatus further comprises an optical combiner to combine the IQ-modulated optical signal and the intensity-modulated signal; and
the optical modulation apparatus is configured so that the IQ-modulated optical signal and the intensity-modulated signal have substantially orthogonal polarizations at the first optical output.

4. The optical modulation apparatus of claim 1, wherein:
the optical modulation apparatus further comprises an optical splitter configured to split light coupled from the laser, via the first optical input, into first and second portions;
the first and second optical modulators are a Mach-Zender intensity modulator and an optical phase modulator configured to operate in series on the first portion of light, to generate an intensity- and phase-modulated optical signal;
the third optical modulator is a Mach-Zender intensity modulator configured to operate on a second portion of light coupled from the laser, to generate a second intensity-modulated optical signal;

the optical modulation apparatus further comprises an optical combiner to combine the intensity and phase modulated optical signal and the second intensity-modulated signal; and the optical modulation apparatus is configured so that the intensity and phase modulated optical signal and the second intensity-modulated signal have substantially orthogonal polarizations at the first optical output.

5. The optical modulation apparatus of claim 1, wherein the first optical modulator is a Mach-Zender intensity modulator configured to modulate light from the first optical input;

the second optical modulator is a Mach-Zender modulator configured to modulate the power difference between first and second orthogonal polarizations of light output from the first modulator; and the third optical modulator is a Mach-Zender intensity modulator configured to modulate a phase of the first polarization or the second polarization of light output from the second optical modulator.

6. The optical modulation apparatus of claim 1, wherein the M-point constellation is a 16-point constellation, with the points arranged according to a hexagonal-close-packed (HCP) lattice or face-centered cubic (FCC) lattice.

7. The optical modulation apparatus of claim 1, wherein the M-point constellation is a 64-point constellation, with the points arranged according to a hexagonal-close-packed (HCP) lattice or face-centered cubic (FCC) lattice.

8. An optical transmitter, comprising:
a laser having an output;
a first optical input configured for optical coupling to the output of the laser;
a first optical output configured for optical coupling to an optical fiber;
first, second, and third optical modulators having respective optical inputs, respective optical outputs, and respective analog inputs configured to receive respective modulating signals, wherein the first, second, and third optical modulators are arranged so as to collectively modulate light coupled into the first optical input in all three dimensions of the three-dimensional Stokes vector space, to produce an optical output signal at the first optical output; and a modulating circuit having a digital input configured to receive digital data and having first, second, and third analog outputs electrically coupled to the analog inputs of the first, second, and third optical modulators and configured to generate first, second, and third modulating signals for driving the first, second, and third optical modulators so as to map the digital data to an M-point optical constellation in the optical output signal, the points in the M-point optical constellation being distributed in the three-dimensional Stokes vector space such that, given a constellation figure of merit defined as the ratio between the squared minimum distance and the average power of the constellation points, the constellation figure of merit for the M-point optical constellation equals at least half the maximum achievable constellation figure of merit for M points in the three-dimensional Stokes vector space.

9. An optical receiver apparatus, comprising:
a Stokes vector receiver having an optical input configured to be coupled to an optical fiber, the Stokes vector receiver being configured to generate sampled data corresponding to the S1, S2, and S3 Stokes parameters of an optical signal received via the optical input; and a digital processing circuit configured to demodulate digital data from the sampled data according to a modulation alphabet corresponding to an M-point optical constellation, the points in the M-point optical constellation being distributed in the three-dimensional Stokes vector space such that, given a constellation figure of merit defined as the ratio between the squared minimum distance and the average power of the constellation points, the constellation figure of merit for the M-point optical constellation equals at least half the maximum achievable constellation figure of merit for M points in the three-dimensional Stokes vector space.

10. The optical receiver apparatus of claim 9, wherein the M-point constellation is a 16-point constellation, with the points arranged according to a hexagonal-close-packed (HCP) lattice or face-centered cubic (FCC) lattice.

11. The optical receiver apparatus of claim 9, wherein the M-point constellation is a 64-point constellation, with the points arranged according to a hexagonal-close-packed (HCP) lattice or face-centered cubic (FCC) lattice.

* * * * *